H. J. WILCOX.
REVOLVING HARROW.
APPLICATION FILED DEC. 21, 1918.
1,396,905.
Patented Nov. 15, 1921.
3 SHEETS—SHEET 1.
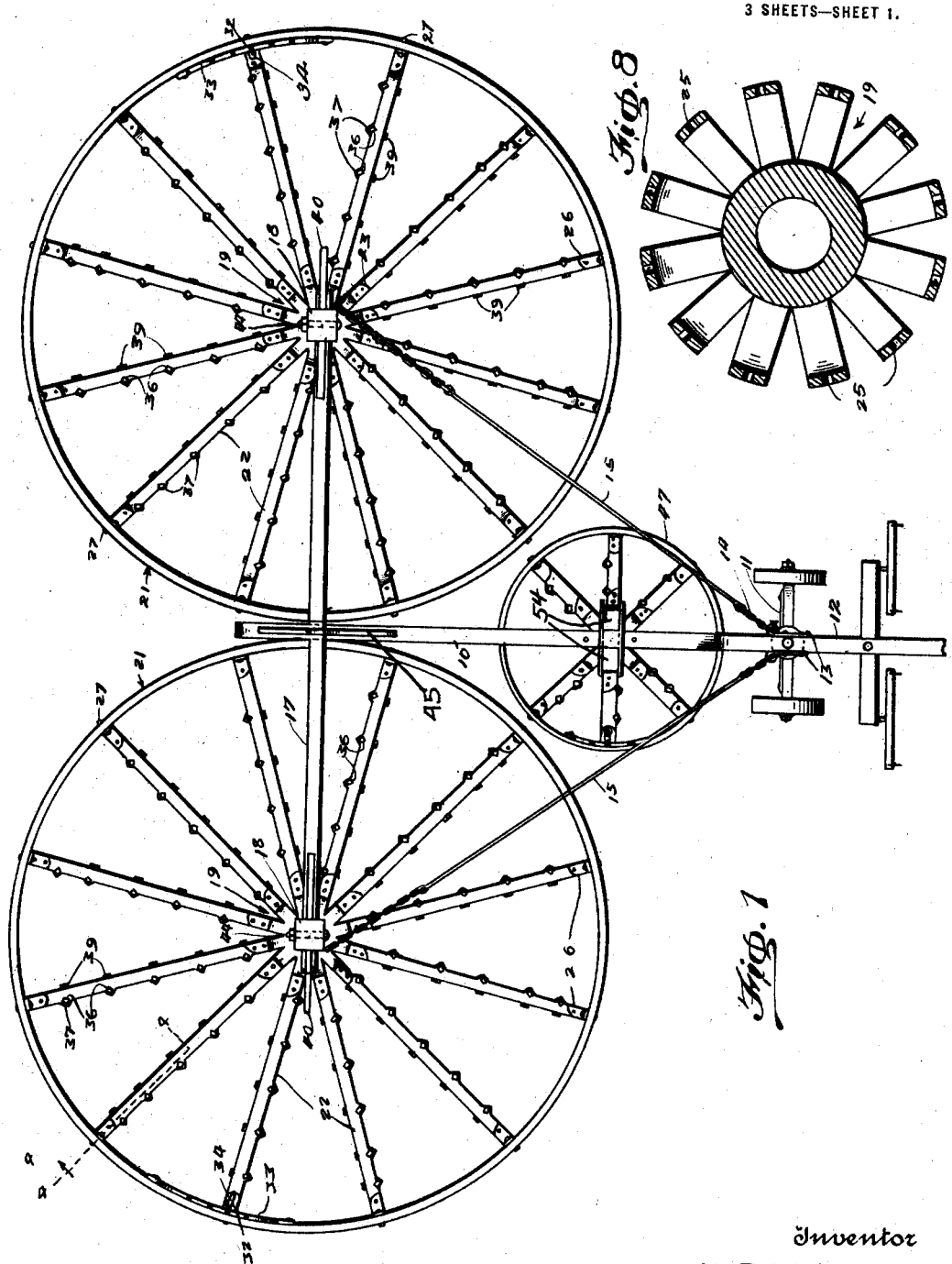

H. J. WILCOX.
REVOLVING HARROW.
APPLICATION FILED DEC. 21, 1918.
1,396,905.
Patented Nov. 15, 1921.
3 SHEETS—SHEET 2.
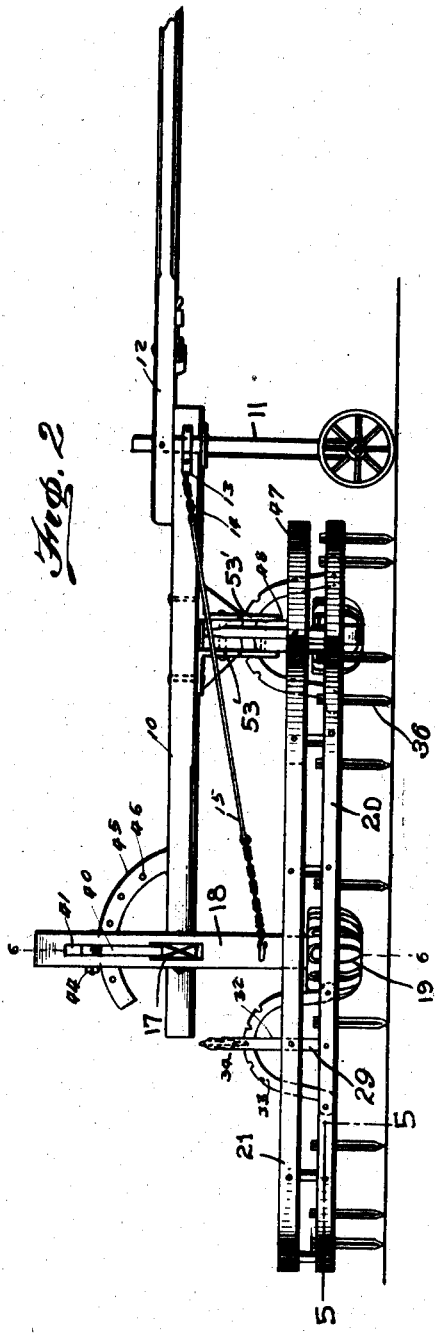
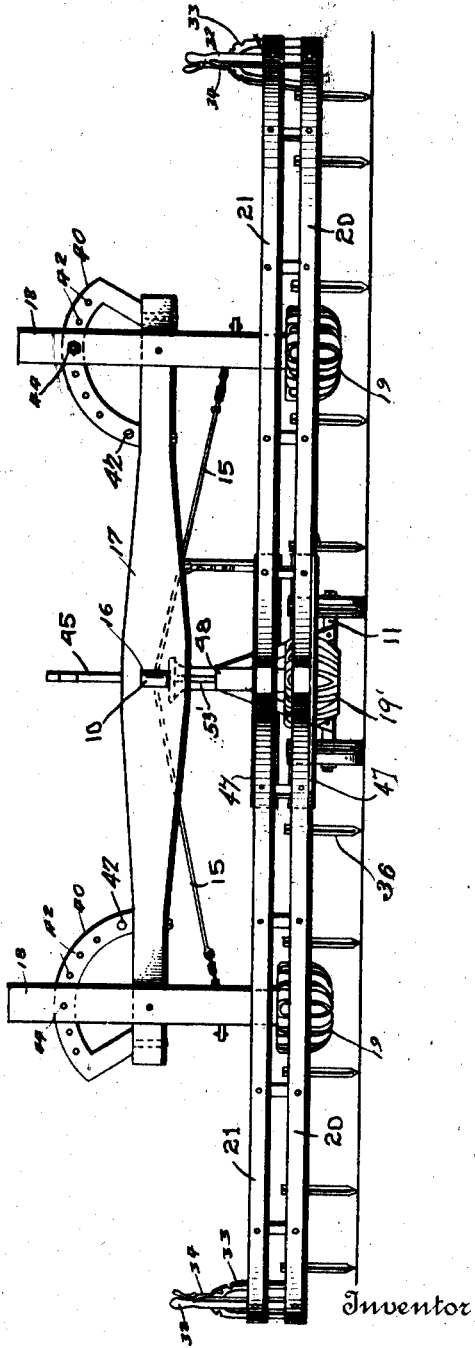

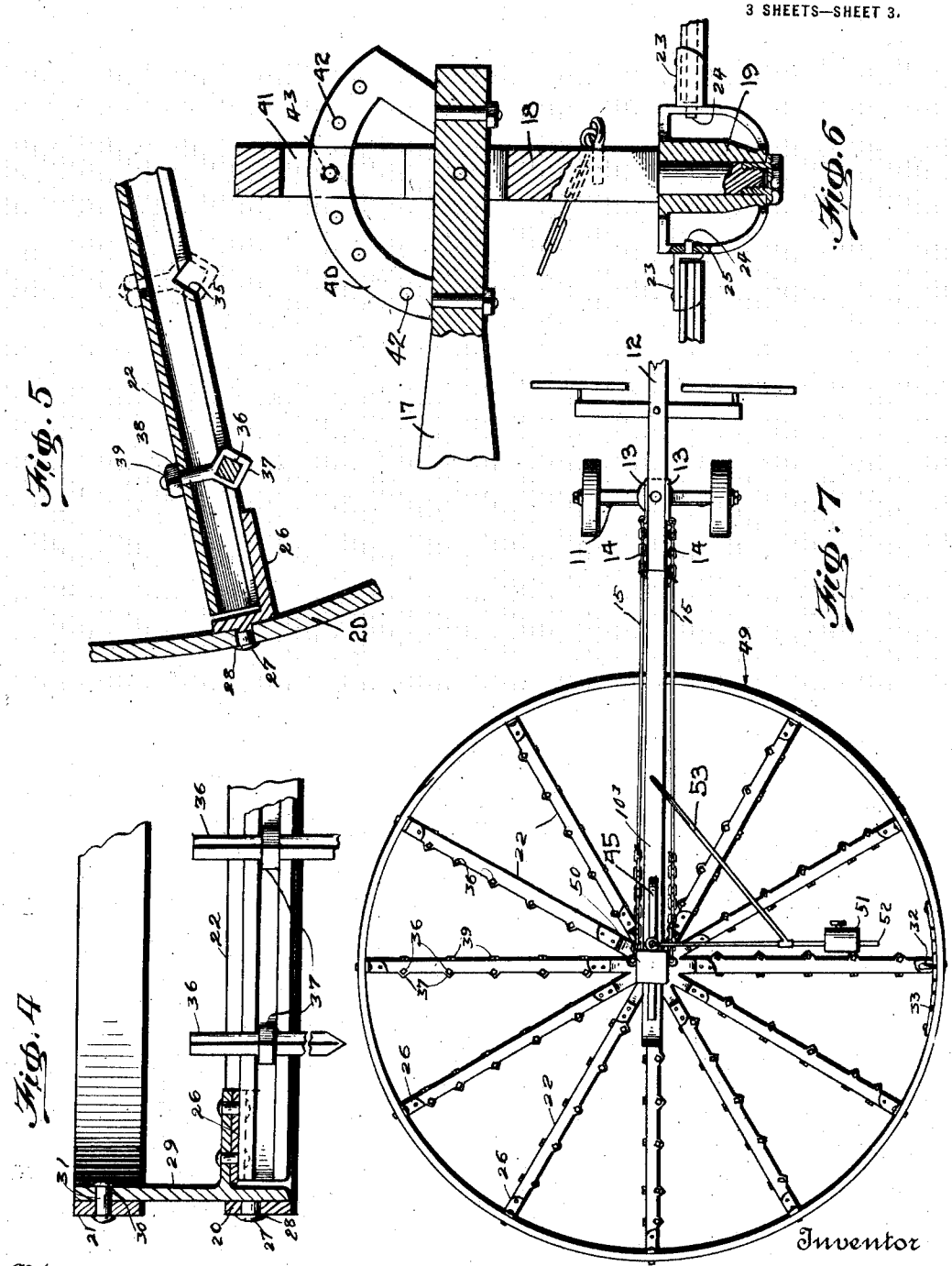

UNITED STATES PATENT OFFICE.

HIRAM J. WILCOX, OF PLACERVILLE, CALIFORNIA.

REVOLVING HARROW.

1,396,905.　　　　　Specification of Letters Patent.　　Patented Nov. 15, 1921.

Application filed December 21, 1918. Serial No. 267,799.

*To all whom it may concern:*

Be it known that I, HIRAM J. WILCOX, a citizen of the United States, residing at Placerville, in the county of Eldorado, State of California, have invented certain new and useful Improvements in Revolving Harrows; and I do hereby declare the following to be a full, clear, and exact description of the invention, such as will enable others skilled in the art to which it appertains to make and use the same.

This invention relates to new and useful improvements in harrows and particularly to revolving harrows.

One object of the present invention is to provide a novel and improved device of this character which includes horizontally rotating harrow elements with novel and efficient means for tilting the harrow elements at different angles with respect to the ground and with respect to each other.

Another object of the invention is to provide novel and improved means for varying the angles of the harrow teeth.

A further object resides in the novel and improved structure of the harrow wheels, their mountings, and the means whereby they are caused to revolve to tear the soil, as the machine moves forwardly.

A still further object is to provide novel and effective means whereby the harrow wheels are capable of adjustment to serve as ground engaging wheels to permit the easy and quick transportation of the machine from one place to another and to facilitate the passage of the harrow through a gateway which is ordinarily too narrow for the harrow.

Other objects and advantages will be apparent from the following description when taken in connection with the accompanying drawings.

In the drawings:

Figure 1 is a top plan view of the harrow showing two harrow wheels in use.

Fig. 2 is a side elevation of the same.

Fig. 3 is a rear elevation of the harrow.

Fig. 4 is an enlarged vertical transverse sectional view taken on the line 4—4 of Fig. 1.

Fig. 5 is an enlarged horizontal sectional view taken on the line 5—5 of Fig. 2.

Fig. 6 is an enlarged vertical sectional view taken on the line 6—6 of Fig. 2.

Fig. 7 is a top plan view of the harrow when only one wheel is used.

Fig. 8 is an enlarged horizontal section through the hub of one of the harrow wheels.

Referring particularly to the accompanying drawings, 10 represents a horizontal beam which has disposed vertically through the forward end thereof the upper portion of the stem of the truck 11. Also receiving the upper end of this stem is the rear end of the draft tongue 12, said tongue being rigidly secured to said stem so that the truck will be turned when the tongue is swung by the draft animals, as will be readily understood. Secured to each side of the forward end of the beam 10 is a plate 13, and connected to each of the plates is a short length of chain 14 which is connected to the forward end of a link 15. Each of these links carries a short length of chain at its other or rear end which is connected to a member which will later be described. The rear end of the beam 10 is secured within an opening 16 in the center of a transverse beam 17. The ends of this beam 17 are pivotally mounted in vertical slots formed in the upper portions of the vertical spindles 18. The lower end of each of the said spindles is journaled in the center of a hollow hub member 19, as shown. This hub is disposed in the center of a large ring 20, and disposed above this ring is a second ring 21. A plurality of spokes 22 are positioned between the hub member and the lower ring, and each spoke has secured on its inner end a casting 23 formed with a stub bolt 24 which is disposed through an opening 25 in the hollow hub member. This stub bolt is arranged to rock axially in said opening. The outer end of each spoke carries a casting 26 which is formed with a stub bolt 27 engaged for rocking movement in an opening 28 in the lower ring 20. Secured to the casting, and on the upper side thereof, is an angle plate 29, the upper end of the vertical portion of which is formed with an opening 30 for the reception of a bolt 31 which also passes through the upper ring 21. Extending upwardly from and forming an integral part of one of the angle members 29 is a lever 32, the upper portion of which is pivotally connected to the upper ring 21. An arcuate notched plate 33 is secured to the lower ring and extends upwardly above the upper ring and is arranged to be engaged by the detent 34 carried by the lever. Thus, upon rocking the lever in either direction, the upper ring will be rotated in a horizontal plane so that the spokes will be rocked in their bearing connections with the lower ring and the hub member. Each of the spokes is in the form of a channel and at regularly spaced intervals throughout its length there are formed the upper and lower notches 35 for the reception of the harrow teeth 36. Bolts having the angular eye portions 37, and shown at 38, are disposed through openings in the channeled members or spokes. The eye portions are arranged to receive the harrow teeth therethrough, and nuts 39, engaged on the other ends of the bolts, firmly clamp the teeth in the notches.

Carried by each end of the beam 17 is an arcuate member 40 which passes through a vertical slot 41 in the upper end of the spindle 18. This arcuate member is formed with an arcuate series of openings 42 which successively register with an opening 43 formed in the upper end of the spindle 18, and receive therethrough a bolt 44. Thus the spindles 18 are capable of rocking movement on their pivotal connections with the ends of the beam 17, and to be held in their different angles of adjustment by the bolts 44. The wheels formed by the rings and spokes, heretofore described, will be tilted at different angles with respect to the ground, and will rotate as the machine is drawn forwardly. The teeth will tear up the soil and properly pulverize it as desired.

Carried by the beam 17, and extending in an upward and rearward direction, is an arcuate member 45 having a series of openings 46.

A smaller harrow wheel 47 is disposed in front of the space between the larger wheels which tears up the soil which cannot be reached by the inner teeth of the larger wheels. This smaller harrow wheel is provided with a vertical spindle 48 which is supported by the brackets 54 carried by the beam 10. The construction of the hub of the wheel 47 and the manner of mounting the same on the spindle 48 is the same as that of the hub and mounting of the larger wheels. It is thought unnecessary to illustrate this separately, the details being identical with those seen in Fig. 6.

As seen in Fig. 7 one harrow wheel 49 is used, the stem 50 of the wheel being rotatably disposed vertically through the rear portion of the beam 10'. This stem is adapted to be rocked on the arcuate member 45 and locked with respect thereto, in the same manner as the two wheels shown in the first form.

When the two wheels of the first form are tilted by adjusting the spindles with respect to the arcuate members 40 either toward the outer or inner ends of the arcuate members, the outer portions or the inner portions of the peripheries of the wheels will be lower than the diametrically opposite portions, whereby when the machine is drawn forwardly the wheels will rotate by contact of the teeth of said low sides with the ground. It will readily be understood that by rocking the spindles on their pivots and securing them at different points on the arcuate members 40, the angles of the wheels with respect to the ground can be varied to suit the desires of the farmer.

Furthermore, the levers 32, when rocked, in either direction, will cause the shifting of the upper and lower rings 20 and 21, whereby the spokes will be rocked and the angles of the teeth changed.

When the single harrow wheel is used the rotation thereof will not always be assured, so to provide that the rotation will take place, I have mounted an adjustable weight 51 on an arm 52 which is movably connected to the beam 10' and secured to the spindle of the wheel. By lifting the weight and moving it to the side of the wheel which it is desired shall be lowered, and engaging the tie rod 53 in an opening in the beam 10', the wheel will be tilted at the desired angle.

The short chain sections at the rear ends of the links 15 are connected to the spindles 18 so as to improve and distribute the draft properly.

By tilting the stems 18 inwardly, after removing the bolts 44, and again replacing said bolts in the innermost openings of the arcuate members 40 and said stems, the harrow members will be held in an approximately vertical position with their rims engaging the ground, and permitting the machine to be drawn in the manner of the ordinary wheeled vehicle. When the harrow members are thus swung up the width of the machine is greatly reduced with the result that the machine may be easily driven through a gateway which would be too narrow to permit the passage of the machine otherwise.

The weight will cause a twist of the beam 10' so that the portion of the harrow wheel which contacts with the ground will be at one side of the line of draft, thereby permitting the wheel to rotate.

What is claimed is:

1. A harrow including horizontally revoluble harrow members having rockable spoke members, ground treating teeth carried by the spoke members, and means for simultaneously rocking all of the said spoke members.

2. A harrow including horizontally revoluble harrow wheel members each consisting of a central hub member and an outer ring member, spoke members extending between the hub and ring and rotatably mounted therein, and means for simultaneously rocking all of the spoke members.

3. A harrow including horizontally revoluble harrow wheels each consisting of a central hub member and an outer ring member, radiating spokes having their ends journaled in the hub and ring, a second ring disposed above the first ring and movably connected therewith, and means for revolving the said rings in horizontal planes to rock the spoke members.

4. A harrow including horizontally revoluble harrow wheels each including a central hub member and an outer ring member, radiating spokes journaled in the hub and ring, movable connections between the outer portions of the spokes and a second ring disposed above the first ring, and an operating lever forming a part of one of said connections and pivotally connected to the second ring whereby the rings are capable of axial movement with respect to each other and in horizontal planes to cause the rocking of said spokes, and ground engaging teeth carried by said spokes.

In testimony whereof, I affix my signature in the presence of two witnesses.

HIRAM J. WILCOX.

Witnesses:
SANFORD O. FOWLER,
HIRAM P. WILCOX.